United States Patent Office 3,788,822
Patented Jan. 29, 1974

3,788,822
NON-MAGNETIC COMPOSITE HAVING A CONSTANT MODULUS OF ELASTICITY
Hiroshi Hashimoto, Chiba, and Toshio Matsumura, Asaka, Japan, assignors to Kabushiki Kaisha Hattori Tokeiten, Tokyo, Japan
Filed Mar. 17, 1971, Ser. No. 125,231
Claims priority, application Japan, Mar. 18, 1970, 45/22,253
Int. Cl. B32b 15/00
U.S. Cl. 29—196.1  3 Claims

ABSTRACT OF THE DISCLOSURE

A non-magnetic material composite having a thermally constant modulus of elasticity in or after subjection to a magnetic field comprising at least two base alloy layers having frequency temperature characteristics opposite to each other and selected from base alloys containing as principal constituents iron and manganese, or further containing one or more other elements such as nickel, cobalt and chromium. The base alloy layers are superposed and joined together so that the opposite characteristics are cancelled by each other. Non-magnetic material composites having a low temperature coefficient of natural frequency over a wide temperature range and excellent mechanical properties are thereby produced.

BACKGROUND OF THE INVENTION

The present invention relates generally to non-magnetic material composites and more particularly to a non-magnetic alloy composite having an excellent characteristic of elastic modulus, employed for hairsprings used for escapement of precision instruments such as clocks or watches, mechanical vibrators of a constant frequency, or vibrators for tele-communication instruments especially where subjected to varying magnetic fields.

DESCRIPTION OF PRIOR ART

Materials having a constant modulus of elasticity, are known. The elinver alloys, or co-elinver alloys and the like, have generally been used where a constant modulus of elasticity is desired. These alloys, are ferromagnetic substances and accordingly are sensitive to external magnetic fields and are subject to partial variations in their mechanical and physical properties. When these materials are used as vibrators their frequency varies if subjected to the influence of an external magnetic field. On the other hand once subjected to the influence of an external magnetic field their residual magnetism remains rather high after the magnetic field has been removed, and as a result their characteristic of constant elastic modulus is lost.

SUMMARY OF THE INVENTION

The present invention contemplates composites of alloys to eliminate the above-mentioned disadvantages of the conventional materials that have been used heretofore, and provides a novel and improved non-magnetic material composite having a constant modulus of elasticity.

A feature of the present invention is that a non-magnetic material having a constant elastic modulus is provided by superposing and joining together at least two base alloy plates having frequency temperature characteristics opposite to each other. The base alloys are selected from base alloys containing from 16 to 33% by weight of manganese, from 0 to 13% by weight of nickel, from 0 to 15% by weight of chromium, from 0 to 20% by weight of cobalt, and the rest being iron; less than 3% by weight of at least one of the elements belonging to the Groups IVa, Va and VIa of the Periodic Table of Elements, and less than 1% by weight of carbon is further added. In this way, a material is obtained which is non-magnetic at room temperature and has a low temperature coefficient of natural frequency over a very wide range of temperatures, excellent mechanical strength, and has a high Q value of mechanical vibration.

A principal object of the present invention is to provide a non-magnetic material composite having a constant modulus of elasticity under varying magnetic conditions and a high mechanical strength.

Another object of the present invention is to provide a non-magnetic material composite having a constant modulus of elasticity and having an antiferromagnetic transformation point in the vicinity of room temperature.

Still another object of the present invention is to provide a non-magnetic material composite having a constant modulus of elasticity which has an excellent characteristic of constant elastic modulus over a wide range of temperatures in the vicinity of room temperature.

Other objects, features and advantages of the alloy material composite according to the invention will be made apparent by the following description of examples of the invention made with reference to the accompanying drawings and appended claims.

DESCRIPTION OF THE PREFERRED EMBODIMENTS

Examples of the present invention will now be described with reference to the accompanying drawings. By melting electrolytic iron, high carbon ferromanganese, electrolytic manganese, 99.5% cobalt, 99.5% nickel, and ferrovanadium in a high frequency induction heating furnace in an inert atmosphere of inert gases, and effecting casting, hot forging and rolling of the melt, a base alloy plate A having a composition of alloy containing 30 Mn–4 Ni–62 Fe+(2 V, 0.7 C), and a base alloy plate B having a composition of alloy containing 30 Mn–4 Ni–54 Fe+(2 V, 0.7 C) are prepared.

The base alloy plates or strips A, B thus obtained are separately maintained at 1250° C. during a period of twenty minutes and thereafter water-quenched, then subjected to a cold working until 50% reduction of cross section area has been realized. The plates or strips are precipitation-hardened by effecting an aging treatment in which the base alloy plates are maintained at 650° C. during an hour. The base alloy plates A, B thus treated, are subjected to determination of the dependency of their natural frequency on temperature by an electrostatic type vibrator controlled process, using the base alloy plates as vibrator materials.

Figure 1:
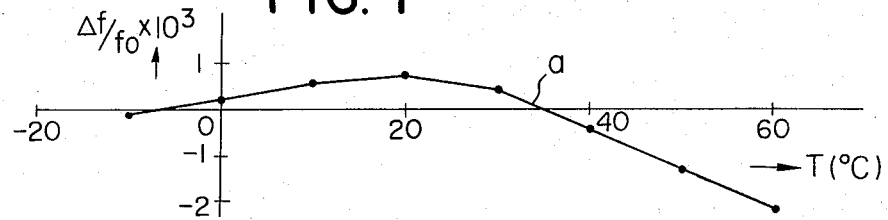
FIG. 1 is a diagram illustrating the frequency temperature characteristic of a base alloy plate used as a layer in the composite of the present invention.
Figure 2:
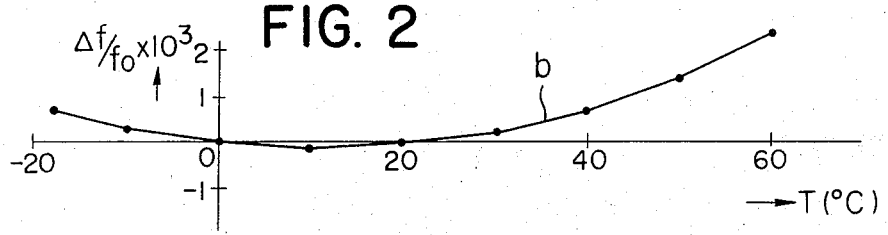
FIG. 2 is a diagram illustrating the frequency temperature characteristic of another base alloy plate for layered use in the present invention.

FIGS. 1 and 2 are diagrams in which the abscissa represents temperature $t$ (° C.), and the ordinate represents frequency coefficient ($\Delta f/f_0$), the lines $a$ and $b$ represent the characteristics of the above-mentioned specimens A and B. As clearly seen from the lines $a$ and $b$ in the above-mentioned diagrams showing the characteristics of specimens, the base alloy plates A and B have frequency temperature characteristics opposite to each other. That is, within the temperature range lower than 20° C., the base alloy plate A has a positive frequency temperature characteristic, and the base alloy plate B has a negative one. Within the temperature range higher than 20° C., the former has negative values and the latter has positive values of the frequency temperature characteristic respectively.

Figure 6:
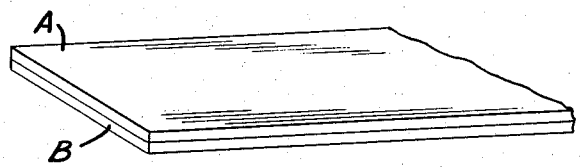
FIG. 6 is a fragmentary perspective view of a composite structure of base alloys from which an alloy material composite according to the invention is developed.

The present invention is constituted in which two, or more base alloy plates having frequency temperature characteristics opposite to each other are superposed one upon the other so that the opposite characteristics of each layer of each alloy are cancelled by each other. That is, the above-mentioned base alloy plates A and B are superposed one upon another as illustrated in FIG. 6 and joined with their contacting surface fused together by maintaining them at 1250° C. during a period of twenty minutes, then water-quenched, and then cold-worked until a 50% reduction of cross section area has been realized, and a superposed alloy plate AB is obtained.

Figure 3:
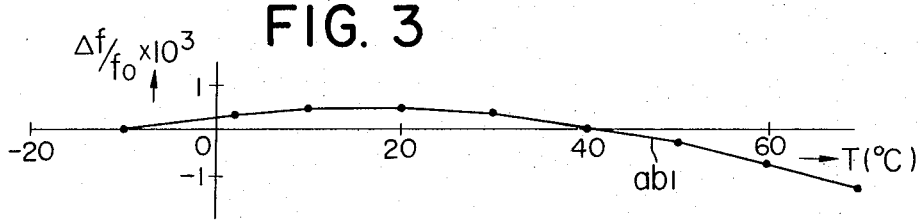
FIG. 3 is a diagram illustrating the frequency temperature characteristic of a non-magnetic material composite having a constant modulus of elasticity according to the invention.

A specimen $AB_1$, whose characteristic is illustrated in FIG. 3, is a plate in which an alloy plate AB has been maintained at 600° C. during a period of an hour, and thereafter subjected to aging treatment so as to be hardened by precipitation.

Figure 4:
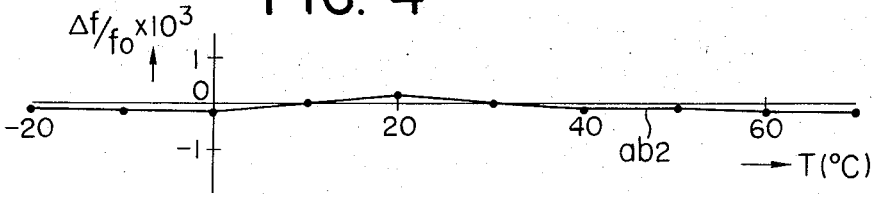
FIG. 4 is a diagram illustrating the frequency temperature characteristic of another non-magnetic material composite having a constant modulus of elasticity according to the invention.

A specimen $AB_2$, whose characteristic is illustrated in FIG. 4, is a plate in which a composite alloy plate has been maintained at 650° C. during a period of an hour, and thereafter subjected to aging so as to be precipitation-hardened.

Figure 5:
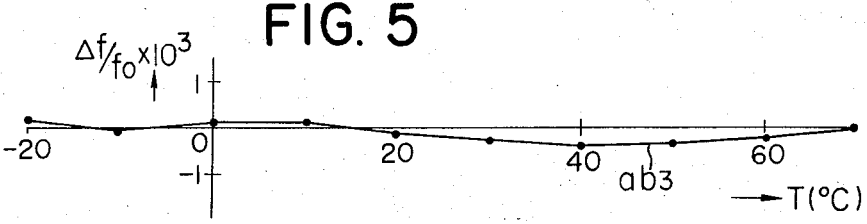
FIG. 5 is a diagram illustrating the frequency temperature characteristic of still another non-magnetic material composite having a constant modulus of elasticity.

A specimen $AB_3$, whose characteristic is illustrated in FIG. 5, is a plate in which an alloy plate AB has been maintained at 700° C. for an hour, and thereafter subjected to aging so as to be precipitation-hardened.

These specimens, $AB_1$, $AB_2$, and $AB_3$, were made into vibrator elements having a thickness of 0.5 mm., a width of 5 mm. and a length of 100 mm., and their natural resonance frequency was 300 Hz. The dependence of their natural frequencies on temperature was determined by means of an electrostatic type transversal vibrator controlled process. The abscissa and the ordinate as seen in the FIGS. 3, 4 and 5 are the same as in FIGS. 1 and 2, and the line $ab1$ in FIG. 3, the line $ab2$ in FIG. 4, and the line $ab3$ in FIG. 5 represent the characteristics of the specimens mentioned above. As seen in the characteristic diagrams, the abnormal temperature area at room temperature is remarkably wider than in the case of the lines $a$ and $b$, and it is understood that the frequency coefficients within the temperature area are extremely low.

As for the characteristics of each base alloy plate A and B before their superposition, their abnormal temperature areas are wide at room temperature, as seen in FIGS. 1 and 2, and the difference of frequencies with regard to the variation of temperature is very small within said area. This is because of the fact that the compositions of these base alloy plates have as principal constituents iron and manganese, and the magnetic transformation point lowers or decreases, in case of Fe-Mn alloy, as the manganese content decreases. As the manganese content in the alloy plate decreases to less than 16 wt. percent (percent by weight), its magnetic transformation point lowers rapidly, and it becomes impossible to obtain an inver characteristic in the vicinity of room temperature. Further, if the manganese content is less than 16 wt. percent the γ-solid solution in its phase composition becomes unstable due to working strain and the like, γ-α transformation is thereby produced, the alloy plate tends to bear a ferromagnetic phase, and it becomes difficult to obtain non-magnetic material. Furthermore, if the manganese content is more than 33 wt. percent, the magnetic transformation point becomes higher, and it becomes impossible to make the inver characteristic appear in the vicinity of room temperature. This is the reason why the content of manganese is specified as from 16 to 33 wt. percent.

Various base alloy plates are used; for example, an alloy in which some of the iron content has been replaced by nickel or cobalt in the above-mentioned Fe-Mn base alloy, so as to ameliorate the workability of said alloy for increasing its tenacity, an alloy in which some iron has been replaced by chromium so as to increase the resistance to acid and the anticorrosiveness of said Fe-Mn alloy, or further an alloy in which some iron has been replaced by two or three elements selected from a group consisting of nickel, cobalt and chromium. Thus, by superposing, as layers and then joining at least two base alloy plates, which are themselves non-magnetic at room temperature and have low temperature coefficients of natural frequency over a wide temperature range, the characteristics of each alloy plate are cancelled by each other, and a composite material having improved and desirable properties is obtained.

A number of examples of from 1 to 25, used as base alloy plates for the layers in the composites in the present invention, will now be described as follows. Their compositions of alloy, conditions of aging, temperature coefficients of frequency and the temperature ranges are shown in Table 1.

TABLE 1

| Composition of alloy (wt. percent) | Condition of aging, ° C. x 1 hr. | $\Delta f/f_0 \cdot 1./T.$ (° C.) | Temperature range (° C.) |
|---|---|---|---|
| 1... 23.2 Mn, 9.3 Ni, bal. Fe, (0.4 V, 0.2 C). | 100 | $45 \times 10^{-6}$ | $-20 \sim 60$ |
| 2... 25 Mn, 8 Ni, bal. Fe, (0.5 V, 0.2 C). | 100 | $33 \times 10^{-6}$ | $-20 \sim 70$ |
| 3... 25.5 Mn, 5.1 Ni, bal. Fe, (0.4 V, 0.1 C). | 250 | $25 \times 10^{-6}$ | $0 \sim 70$ |
| 4... 18 Mn, 4 Cr, bal. Fe, (0.6 V, 0.3 C). | 300 | $1.5 \times 10^{-6}$ | $-5 \sim 35$ |
| 5... 24.2 Mn, 6.4 Cr, bal. Fe, (1 Be, 0.5 C). | 270 | $3.5 \times 10^{-6}$ | $-10 \sim 40$ |
| 6... 30 Mn, 15 Cr, bal. Fe, (1 V, 0.7 C). | 480 | $1.5 \times 10^{-6}$ | $35 \sim 65$ |
| 7... 22.1 Mn, 8.6 Cr, bal. Fe, (1.96 V, 0.5 C). | 300 | $20 \times 10^{-6}$ | $10 \sim 60$ |
| 8... 20 Mn, 5 Co, bal. Fe, (0.4 V, 0.2 C). | 250 | $2.5 \times 10^{-6}$ | $-10 \sim 30$ |
| 9... 25 Mn, 7 Co, bal. Fe, (2 Mo, 0.5 C). | 280 | $2.5 \times 10^{-6}$ | $-10 \sim 60$ |
| 10... 28 Mn, 8 Co, bal. Fe, (2 Nb, 0.5 C). | 300 | $2.5 \times 10^{-6}$ | $10 \sim 50$ |
| 11... 30 Mn, 15 Co, bal. Fe, (0.8 V, 0.5 C). | 300 | $1.1 \times 10^{-6}$ | $0 \sim 45$ |
| 12... 16 Mn, 2 Ni, 3 Cr, bal. Fr, (0.4 V, 0.2 C). | 200 | $4 \times 10^{-6}$ | $-15 \sim 45$ |
| 13... 25 Mn, 4 Ni, 4 Cr, bal. Fe, (0.4 V, 0.2 C). | 300 | $5 \times 10^{-6}$ | $20 \sim 70$ |
| 14... 30 Mn, 4 Ni, 6 Cr, bal. Fe, (0.5 V, 0.3 C). | 100 | $20 \times 10^{-6}$ | $-10 \sim 60$ |
| 15... 33 Mn, 8 Ni, 3 Cr, bal. Fe, (0.6 V, 0.3 C). | 250 | $30 \times 10^{-6}$ | $30 \sim 80$ |
| 16... 20 Mn, 2 Ni, 4 Co, bal. Fe, (0.4 V, 0.2 C) | 250 | $5.5 \times 10^{-6}$ | $-20 \sim 50$ |
| 17... 25 Mn, 8 Ni, 15 Co, bal. Fe, (1.5 Ti, 0.5 C). | 300 | $3 \times 10^{-6}$ | $-20 \sim 55$ |
| 18... 33 Mn, 8 Ni, 16 Co, bal. Fe, (0.5 V, 0.2 C). | 350 | $2.5 \times 10^{-6}$ | $20 \sim 60$ |
| 19... 19 Mn, 3 Cr, 2 Co, bal. Fe, (0.4 V, 0.1 C). | 250 | $1.5 \times 10^{-6}$ | $-10 \sim 30$ |
| 20... 25 Mn, 5 Cr, 3 Co, bal. Fe, (1 V, 0.5 C). | 300 | $9 \times 10^{-6}$ | $-10 \sim 30$ |
| 21... 32 Mn, 6 Cr, 15 Co, bal. Fe, (0.8 V, 0.4 C). | 300 | $20 \times 10^{-6}$ | $0 \sim 30$ |
| 22... 20 Mn, 2 Cr, 1 Ni, 2 Co, bal. Fe, (0.4 V, 0.2 C). | 250 | $7.5 \times 10^{-6}$ | $-20 \sim 20$ |
| 23... 25 Mn, 3 Cr, 3 Ni, 5 Co, bal. Fe, (0.3 V, 0.1 C). | 200 | $4 \times 10^{-6}$ | $-10 \sim 55$ |
| 24... 28 Mn, 4 Cr, 2 Ni, 5 Co, bal. Fe, (0.4 V, 0.2 C). | 500 | $12.5 \times 10^{-6}$ | $10 \sim 50$ |
| 25... 32 Mn, 3 Cr, 2 Ni, 10 Co, bal. Fe, (0.4 V, 0.1 C). | 300 | $5 \times 10^{-6}$ | $5 \sim 55$ |

As understood from the foregoing, at least two alloy plates as layers, having frequency temperature characteristics opposite to each other, selected from base alloy plates, non-magnetic themselves and having low temperature coefficients of natural frequency over a wide temperature range, have been superposed and joined together, so that the opposite characteristics are cancelled by each other, and improved composite material is obtained.

Figure 8:
FIG. 8 is a fragmentary perspective view of a composite structure of base alloys from which a material composite according to the invention is developed.

Other examples of the present invention are shown in Table 2. According to the same manufacturing process as described in the above-mentioned base alloy plates A and B, base alloy plates C to N having compositions set forth in Table 2 have been produced, and those which had frequency temperature characteristics opposite to each other, i.e. C and D, E and F, . . . M and N, have been superposed respectively, and after being fused (welded) together by maintaining them at 1250° C. during 20 minutes, they have been water-quenched, and finally cold-worked until a 50% reduction of cross section area was realized. Then, different aging treatments have been effected respectively on each composite specimen, as seen in Table 2, and specimens CD, EF, . . . MN have been obtained. These specimens are respectively composite vibrator materials as those in the above-mentioned examples. Their temperature coefficients of their resonance frequency coefficients and their temperature ranges have been determined.

frequency temperature characteristics have been superposed one upon another, so as to cancel each other's opposite frequency temperature characteristics. However, it is also possible to effect the superposition in such a manner that, one base alloy plate having one characteristic is interposed between two base alloy plates. The latter having other characteristics are superposed on both sides of the interposed base alloy plate, so that the opposite characteristics of the layered plates are cancelled as a whole by each other. By way of an example of this method, since a base alloy plate containing chromium in its composition is high in antioxidativeness and has rust-prevention action, such base alloy plates containing chromium are placed on both sides of an intermediate base alloy plate containing nickel, cobalt or the like and having excellent tenacity and remarkable cold-workability. These three base alloy plates are superposed and joined together as illustrated in FIG. 8 so that the opposite frequency temperature characteristics thereof are cancelled. In this way composite materials in which variations of frequency will not occur, even when the temperature varies, are obtained.

The superposition is effected in the examples mentioned above, by the superficial fusion at the surfaces of the plates due to the heat produced at the time of treating the melt, but it is also possible to effect the superposition in such a way that each base alloy plate is separately

TABLE 2

| Specimen | Composition of base alloy | | | | | Additive | | | Temperature coefficient of resonance frequency coefficient | | |
| --- | --- | --- | --- | --- | --- | --- | --- | --- | --- | --- | --- |
| | Mn | Co | Ni | Cr | Fe | V | W | C | Aging condition, ° C. x 1 hr. | $\Delta f_o/f_o \cdot 1/T$ (° C.) | Temperature range (° C.) |
| CD: | | | | | | | | | | | |
| C | 30 | 4 | 4 | | 62 | 2 | | 0.7 | 600 | $5 \times 10^{-6}$ | $-10 \sim 70$ |
| D | 30 | 12 | 2 | 3 | 53 | | 2 | 0.7 | | | |
| EF: | | | | | | | | | | | |
| E | 25 | 6 | 3 | 3 | 63 | 2 | | 0.7 | 550 | $6 \times 10^{-6}$ | $-20 \sim 50$ |
| F | 28 | 12 | 2 | 3 | 55 | 2 | | 0.7 | | | |
| GH: | | | | | | | | | | | |
| G | 22 | | 2 | 3 | 73 | 2 | | 0.7 | 650 | $5 \times 10^{-6}$ | $-20 \sim 40$ |
| H | 30 | | 6 | 5 | 59 | 2 | | 0.7 | | | |
| IJ: | | | | | | | | | | | |
| I | 25 | 13 | 4 | | 58 | | 2 | 0.7 | 650 | $4 \times 10^{-6}$ | $-10 \sim 40$ |
| J | 25 | 7 | 4 | | 64 | 2 | | 0.7 | | | |
| KL: | | | | | | | | | | | |
| K | 32 | 12 | 2 | 3 | 51 | 1 | | 0.7 | 650 | $6 \times 10^{-6}$ | $-10 \sim 60$ |
| L | 28 | | 6 | 4 | 62 | 2 | | 0.7 | | | |
| MN: | | | | | | | | | | | |
| M | 25 | 6 | 3 | 3 | 63 | 2 | | 0.7 | 600 | $5 \times 10^{-6}$ | $0 \sim 70$ |
| N | 30 | 4 | 4 | | 62 | 2 | | 0.7 | | | |

As seen clearly in Table 2, the composite materials according to the present invention, have their abnormal temperature area extending over an extremely wide range, i.e. more than 70° C. at room temperature, and the variant values of frequency temperature coefficients therewithin also are remarkably low, i.e. less than $6 \times 10^{-6}$ 1/° C. Further, their mechanical strengths are increased by aging.

It is to be noted that the values of magnetic susceptibility of the materials according to the present invention, determined in each magnetic field of 100, 500 and 1,000 oersteds by a magnetic balance method, were all less than 1.1. Due to the fact that the aging is effected at a high temperature, i.e. 600° C., the shaping of the material as a vibrator element becomes possible.

In each example shown in Table 2 mentioned above, examples where the compound addition of vanadium or tungsten and carbon have been effected, are shown, but, in addition to the elements mentioned above, less than 3 wt. percent of at least one element selected from a group consisting of titanium, zirconium and hafnium belonging to the Group IVa in the Periodic Table of Elements, niobium and tantalum belonging to the Group Va, chromium and molybdenum belonging to the Group VI, and less than 1 wt. percent of carbon may be added in compound addition.

According to each example mentioned above, examples are shown in which base alloy plates having opposite treated so that the precipitation hardening will occur, and thereafter the base alloy plates are joined together to form the composite by means of an adhesive agent.

Figure 7:
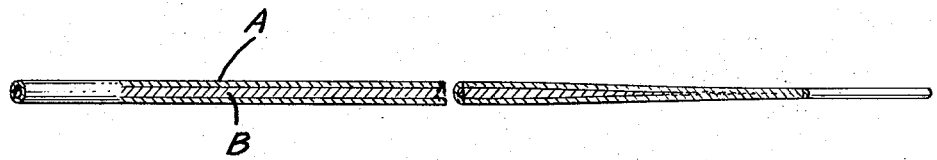
FIG. 7 is a fragmentary cross section view of a circular structure embodying an alloy composite according to the invention and illustrates another composite material according to the invention.

The present invention includes, not only the superposition of flat plate-like bodies, but also the superposition of a tubular base alloy material onto the outside of a central round bar. That is, one of two base alloy bodies having opposite frequency temperature characteristics may be of a tubular form and the other a round rod, and after the tubular form body is superposed onto the round rod base alloy body, a fine composite wire is obtained by a suitable process such as swaging, wire drawing and the like as illustrated in FIG. 7. In this case, by adjusting the sectional area ratio of the outside and inside base alloy bodies, a wire rod composite having a desired frequency temperature coefficient is obtained. Further by using base alloys having sufficiently anticorrosive composition as the outside alloy, a non-magnetic material composite having a constant elastic modulus, excellent in frequency temperature coefficient, anticorrosiveness and mechanical strength, is obtained.

Figure 9:
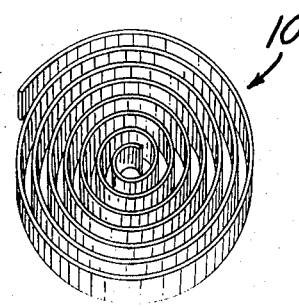
FIG. 9 is a plan view of a spring made of layered material composite according to the invention.

As indicated heretofore, the alloy strips made of at least two base alloy strips or plates are used to make energy conversion devices such as vibrators and springs, for example, escapement springs for clocks and watches. A watch spring 10 is illustrated in FIG. 9 that is non-magnetic and has the constant elastic modulus and other characteristics as before explained. Thus devices that convert energy or act as energy storage devices and are elastic and have memory can be constructed according to the invention. When subjected to an external magnetic field there is no residual magnetism effect that would change the functional characteristics of these devices.

What we claim and desire to secure by Letters Patent is:

1. A metal composite having a thermally constant modulus of elasticity, said composite comprising at least two layers of different ferromanganese alloys joined by metallurgical bonding to form a unitary composite, each of said layers having modulus of elasticity characteristics oppositely and compensatingly matched to cancel the characteristic of said other layers and each layer being selected from the group of ferromanganese alloys essentially consisting of a base alloy of the composition:

| Element: | Wt. percent |
|---|---|
| Carbon | To 1.0 |
| Manganese | 16–33 |
| Nickel | 0–13 |
| Chromium | 0–15 |
| Cobalt | 0–20 |
| Metal or mixture of metals from the group consisting of V, Be, Nb, Mo, W, Ti, Zr, Hf, and Ta. | |
| Iron | Balance | said layers being superposed and metallurgically bonded without alloying said layers to form an non-magnetic composite.

2. A composite plate according to claim 1 consisting of three layers, said outer ferromanganese alloy layers containing ferromanganese alloys containing chromium and said inner layer is a ferromanganese alloy which is free from chromium.

3. An elastically oscillating device comprising an elastic element having a thermally constant modulus of elasticity, said element being fashioned from the composite according to claim 1.

References Cited

UNITED STATES PATENTS

| | | | |
|---|---|---|---|
| 1,902,589 | 3/1933 | Scott | 29—95.5 |
| 1,939,085 | 12/1933 | Scott | 29—195.5 |
| 1,991,438 | 2/1935 | Wohrman | 29—195.5 |
| 2,753,623 | 7/1956 | Boessenkool | 29—196.1 |
| 3,231,709 | 1/1966 | Foley | 75—128 A |
| 3,359,083 | 12/1967 | Leichter | 29—196.1 |
| 3,378,357 | 4/1968 | Alban | 29—196.1 |
| 3,556,777 | 1/1971 | Petry | 75—128 A |

HYLAND BIZOT, Primary Examiner